United States Patent [19]

Sowell et al.

[11] Patent Number: 5,047,927
[45] Date of Patent: Sep. 10, 1991

[54] MEMORY MANAGEMENT IN PACKET DATA MODE SYSTEMS

[75] Inventors: Richard G. Sowell, Sam Jose; Robert Pieters, Diamond Springs, both of Calif.

[73] Assignee: National Semiconductor Corporation, Santa Clara, Calif.

[21] Appl. No.: 263,715

[22] Filed: Oct. 28, 1988

[51] Int. Cl.⁵ .................................................. G06F 13/28
[52] U.S. Cl. .............................. 364/200; 364/242.31; 364/222.2
[58] Field of Search ... 364/200 MS File, 900 MS File; 370/60, 94.1, 94.2, 94.3

[56] References Cited
U.S. PATENT DOCUMENTS 4,317,197  2/1982  Ulug .................................. 370/94.3
4,864,495  9/1989  Inaba ................................. 364/200
4,868,813  9/1989  Suzuki .............................. 370/60

Primary Examiner—Thomas M. Heckler
Attorney, Agent, or Firm—Limbach, Limbach & Sutton

[57] ABSTRACT

A memory management system for a packet data mode system is used in conjunction with a direct memory access controller. The management system is of the type for communicating packet data into and out of memory storage. Each message in a packet data mode system contains a control address field and a data field. A change of field signal is generated and communicated to the DMA controller. An end of message signal is generated and communicated to the DMA controller. The control address field is stored separately from the data field. This increases the efficiency of the data storage and enhances the density of information packing into the memory storage.

14 Claims, 4 Drawing Sheets

IMPROVED HDLC SYSTEM DIAGRAM

ADDRESS POINTER LOGIC (APL)    VALID ADDRESS LOGIC (VAL)
RECEIVER EXAMPLE

| APL value | CORRESPONDS TO VECTOR | VAL | |
|---|---|---|---|
| 0 0 0 | → VA | 0 | |
| 0 0 1 | → VB | 0 | A 0 IN VAL INDICATES A USED ADDRESS VECTOR |
| 0 1 0 | → VC | 0 | |
| 0 1 1 | → VD | 1 | A SINGLE 1 INDICATES THAT NO DF DATA WAS RECEIVED IN THE VC/VD MESSAGE |
| 1 0 0 | → VE | 0 | |
| PRESENT APL VALUE  1 0 1 | → VF | 0 | DMA IS USING VECTOR VF AND HAS PLACED AT LEAST ONE BYTE OF DATA |
| 1 1 0 | → VG | 1 | A 1 IN VAL INDICATES A VALID ADDRESS VECTOR |
| 1 1 1 | → VH | 1 | |

ON THE NEXT EOM INTERRUPT THE DMA WILL BEGIN USING VG AND THE CPU CAN UPDATE VA, VB, VC, VD, VE, AND VF

VECTOR VD'S BLOCK CAN BE REALLOCATED TO A NEW MESSAGE'S DF FIELD

*FIG. 4*

MEMORY MANAGEMENT IN PACKET DATA MODE SYSTEMS

FIELD OF THE INVENTION

This invention relates to the field of high level digital computer communications protocols. More particularly, this invention relates to the storage of digital messages communicated over a packet data mode (PDM) network which includes a direct memory access (DMA) and high level data link controller (HDLC) channel.

BACKGROUND OF THE INVENTION

In traditional data communications systems, data which is transmitted or received in packet data mode networks, such as integrated services digital network (ISDN), is enclosed by unique delimiters. These delimiters, known as flags, are represented by a digital sequence of "01111110". This data stream includes a Control/Address field (CAF), a Data Field (DF) and an error checking field such as a Cyclic Redundancy Check (CRC).

To maintain uniqueness of these delimiters all three fields are "zero inserted". This means that after any five consecutive ones, a zero is inserted between the 5th one and the adjacent data bit.

During a transmission sequence, the CRC field data is based on a division of the CAF and DF fields by a known polynomial. The remainder from that division is appended to the CAF and DF fields. During a receiving sequence, the division by the polynomial is again performed on the CAF and DF. The result is compared to the incoming CRC field. If the two calculations yield consistent and correct results the information in the CAF and DF fields is accepted, otherwise it is rejected.

In traditional PDM systems such as ISDN, a message is the combination of a CAF field plus the DF field. These message lengths can vary from 4 bytes to 260 bytes. The user must allocate a block of memory that can accommodate the largest possible message even though only a small amount of that block may be used, such as for a 4 byte message.

In traditional systems, variable length blocks and variable starting addresses are typically not used because of the software housekeeping and overall overhead introduced to the central processing unit (CPU). The traditional approach is to reserve the CPU to process the incoming and outgoing messages and to program the DMA and the HDLC controller. Allocated blocks are always equal to or greater than the largest message. A single message occupies each block starting at the top of each block. Because ISDN allows messages as long as 260 bytes a memory space of 256 bytes ($2^8$) is too small. Unfortunately, because of binary arithmetic, in this case the user will have to allot a memory space of 512 bytes ($2^9$) to accommodate a 260 byte message.

FIG. 1 shows a conceptualized block diagram view of a traditional HDLC system used for LAPD. (LAPD is a protocol used in ISDN and stands for "link access protocol in the "D" channel"). The purpose of such a system is to communicate with other systems through a packet data network, using a common protocol such as LAPD, LAPB, or X.25.

A transceiver 110 is coupled to receive and transmit packet data from a twisted pair "S" or "U" interface 112. This twisted pair interface 112 might be for example an existing telephone line.

The transceiver 110 is also coupled to an HDLC controller 114 over a serial digital data bus 116. The HDLC controller includes a receiver circuit RX 118, a transmitter circuit TX 120 and a FIFO buffer 122. The HDLC controller 114 is coupled to a DMA controller 124 through a parallel digital data bus 126.

The DMA controller 124 is coupled to a central processing unit (CPU) 128 and a memory management unit (MMU) 130 through the CPU bus 132. The MMU 130 is coupled to the memory 134 through the memory bus 136.

Each of the transceiver 110, the HDLC controller 114, the DMA controller 124, the CPU 128 and the MMU 130 are coupled to receive from and transmit to a communication/control signal bus 138. The MMU 130 and the memory 134 have a separate communication/control signal bus 140. The HDLC controller 114 is coupled to supply an interrupt signal 142 to the CPU 128, a buffer full signal (RBF) 144 to the DMA controller 124 and a buffer empty signal (BES) 146 to the DMA controller 124. The DMA controller 124 is coupled to supply an interrupt signal 148 to the CPU 128.

In FIG. 1 the twisted pair interface 112, the transceiver 110, the serial digital data bus 116 and the HDLC controller 114 form the packet data mode (PDM) system. The DMA controller 124, the CPU bus 132, the CPU 128, the MMU 130 the memory bus 136 and the memory 134 form the digital processing system. The parallel digital data bus 126 couples the PDM system to the digital processing system.

The roles of the individual blocks within the system of FIG. 1 are described below:

Transceiver

The transceiver device is used to terminate the PDM network. In ISDN this would include terminating the "S" or "U" interfaces. During reception, the transceiver is used to interpret the signal on the twisted pair (term used to describe existing phone lines) and to extract clock, timing, and data information from this signal. After the data is converted to a serial digital format, it is then passed to the HDLC block.

During transmission, the transceiver converts the parallel digital information to a serial format with the appropriate line code. When terminating the "S" interface, the transceiver provides echo cancellation for full duplex operation. The transceiver is controlled by the CPU. However, bidirectional communications enable the transceiver to pass on status and line information to the CPU.

HDLC

The high level data link control (HDLC) block is responsible for formatting and decoding the digital information transversed across its borders. The HDLC block is comprised of two major sections, the transmitter TX and the receiver RX. In the transmitter portion of the HDLC, the duties to be performed include: appending flags to the beginning and ending of the message, calculation of the CRC, zero insertion, Interframe fill (IFF), abort character generation, error detection, and asynchronous control communications to the DMA/CPU. On the receiver side some of the duties include: The recognition of valid messages, address recognition, zero deletion, CRC checking, error detection, abort and IFF character recognition, and asynchronous control communications to the DMA/CPU. A FIFO section is used to buffer the data between the HDLC block and the DMA.

DMA

The direct memory access (DMA) provides a fast means for retrieving and placing data that is required for the HDLC block. The DMA is generally used in a "cycle stealing mode" which provides an efficient means of data movement.

CPU

The central processing unit (CPU) is used to control the HDLC system and shares a common bus with the DMA. It obtains instructions for controlling the system from the memory via the memory management unit (MMU). It is responsible for the organization, interpretation, and manipulation of the data conversed in the system.

MMU

The memory management unit (MMU) is used to interface the DMA/CPU to a memory system. This arrangement is used when the memory system is required to hold large amounts of data which the system must access. The MMU also provides security of data when the CPU is required to perform multiple tasks.

MEMORY

The memory is used for all data storage required for system operation and may be shared by more than one CPU system. In the memory are the various programs the CPU uses to control the HDLC system and data manipulation of the messages conversed. The memory will also contain areas called "packet ram" where the messages for the HDLC will be stored.

Inside the dashed block 152 in FIG. 1 is the portion of the system that the present invention improves upon. The traditional interactions of the three blocks outlined (HDLC, DMA and CPU) are described below.

Receiver

In the receiver side of the HDLC, the CPU first programs the DMA with the address to where the next message will be stored, and the maximum number of allocated byte locations for that message. When the receiver (programmed also by the CPU) detects a valid message it will begin sending receive buffer full (RBF) signals to the DMA, to which the DMA will respond by placing byte by byte, the information contained in the message. Upon receiving a complete message and having had the DMA placed the entire message in memory, the receiver issues an interrupt to the CPU indicating that the DMA must be programmed with a new address for the next message. The above process repeats as messages are received.

Transmitter

On the transmitter side of the HDLC, the CPU programs the DMA with the address and length of the message to be sent. After being commanded to start transmission (by the CPU) the transmitter will request data from the DMA through the buffer empty signal (BES). The DMA will in turn retrieve byte by byte, from memory, the data required for the message being sent. Having retrieved all of the data, the DMA will issue an interrupt to the CPU indicating it can be programmed with a new address of the next message to be transmitted. As in the receiver, the process above repeats for each message transmitted.

Some of the drawbacks of the above approach are outlined below:

a) Memory efficiency is low because of the large disparity between the required allocation of memory area and the largest message to be received. 252 (512-260) byte locations will not be used even though they have been allocated.

b) Many messages contain CAF and CRC information only, and are very short by nature. This type of message will typically account for approximately 8 of 10 messages conversed. Memory efficiency suffers greatly because of this type of message because 2 to 8 bytes are being stored in a 512 byte block of memory.

c) Nine bit block allocations (512 locations) are naturally awkward to handle in digital processors because the number 9 is not congruent with the binary base number system common to all commercial digital processors.

d) Transmission of data to more than one destination, excluding broadcast transmission, requires that the CAF information be modified between each transmission or that DF information be duplicated with individual CAF "headers".

e) On occasion the user is required to insert, alter or delete information (usually in the CAF) before resending the message. With the above method a large block of data is potentially required to be moved before the retransmission.

f) Traditional DMA controllers interrupt the CPU after each message is placed in the appropriate block of memory, requiring address information about the next message. This reduces the CPU efficiency because of interrupt latency. The above constraints provide for the inefficient use of system memory and CPU processing time.

SUMMARY OF THE INVENTION

This invention is a memory management system for a packet data mode system which is used in conjunction with a direct memory access controller. The management system is of the type for communicating packet data into and out of memory storage. Each message in a packet data mode system contains a control address field and a data field. The invention includes means for generating a change of field signal and for communicating that signal to the DMA controller. The invention also includes means for generating an end of message signal with means for communicating the end of message signal to the DMA controller. The control address field is stored separately from the data field. This increases the efficiency of the data storage and enhances the density of information packing into the memory storage. By designing a DMA that closely interacts with an HDLC channel, a more efficient information management system can be realized. Through this DMA/HDLC synergy, a greater data throughput will result. In addition, the advantages above can be achieved using a simple fixed block length allocation of memory, preserving this efficient and simple approach to memory allocation.

BRIEF DESCRIPTION OF THE DRAWINGS

FIG. 4 shows a receiver example of the APL and VAL logic according to the present invention.

DETAILED DESCRIPTION OF THE PREFERRED EMBODIMENT

Figure 1:
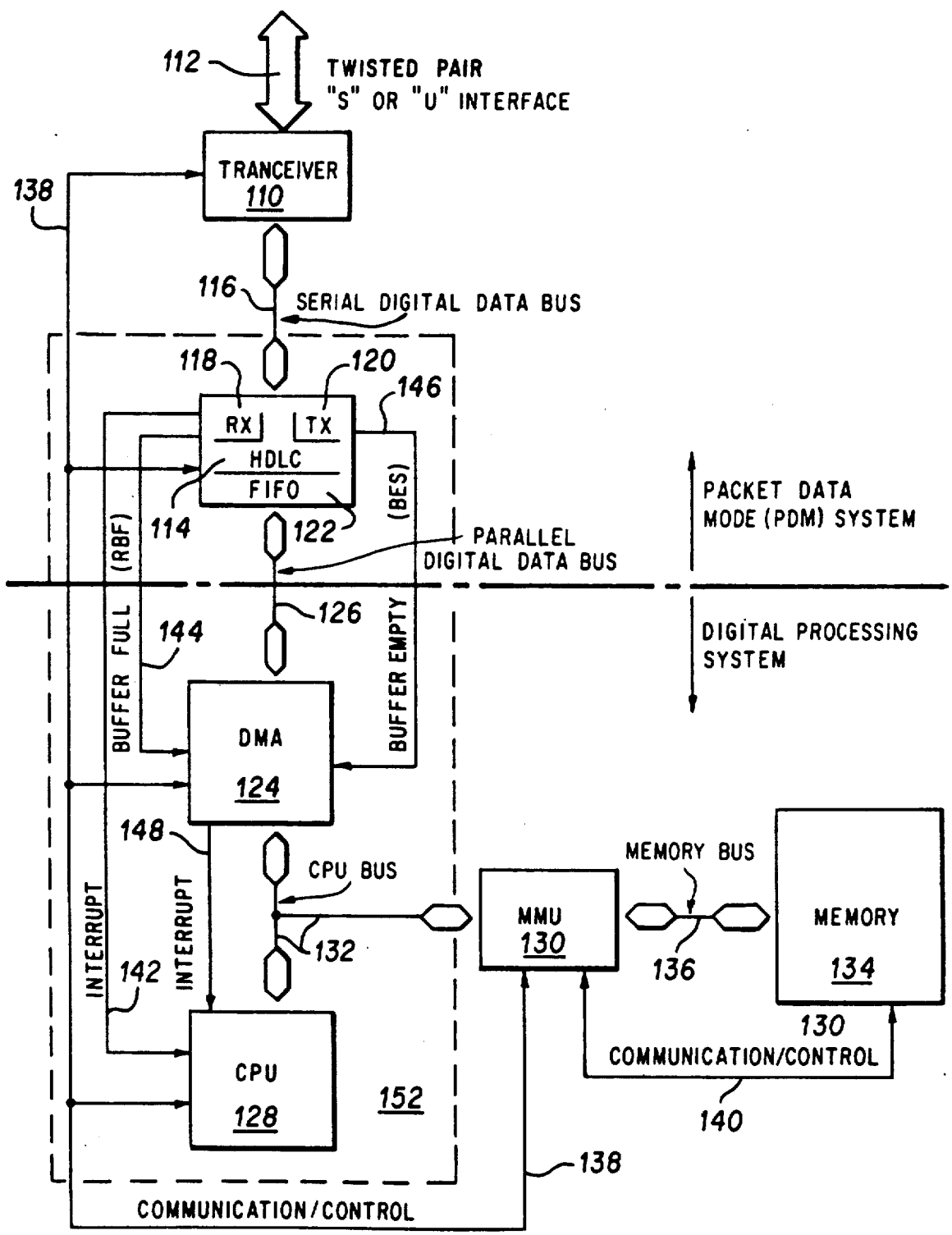
FIG. 1 shows a block diagram of the prior art.
Figure 2:
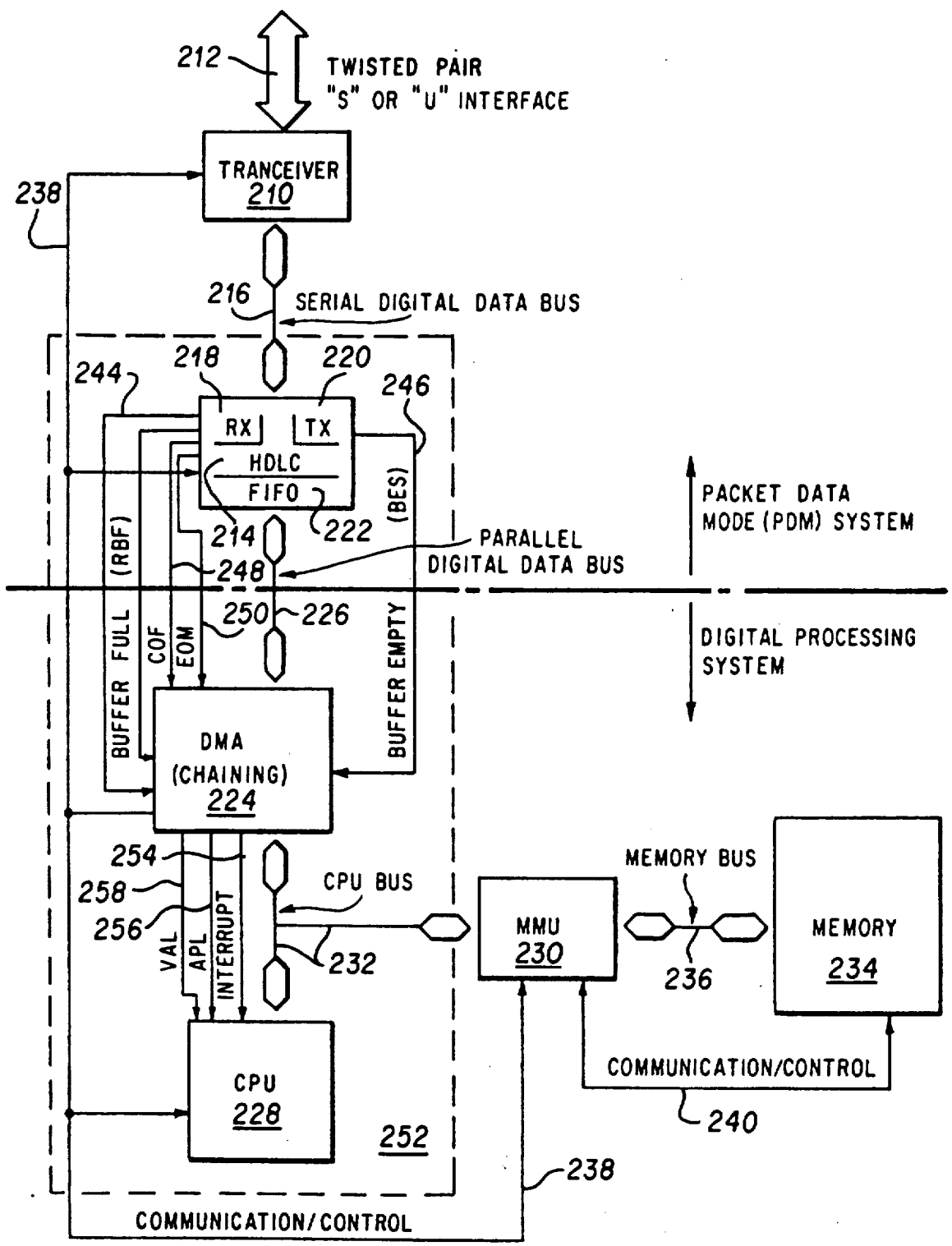
FIG. 2 shows a block diagram of the preferred embodiment of the present invention.

Referring to FIG. 2, there is shown a block diagram of the preferred embodiment. A transceiver 210 is coupled to receive and transmit packet data from a twisted pair "S" or "U" interface 212. This twisted pair interface 212 might be for example an existing telephone line.

The transceiver 210 is also coupled to an HDLC controller 214 over a serial digital data bus 216. The HDLC controller includes a receiver circuit RX 218, a transmitter circuit TX 220 and a FIFO buffer 222. The HDLC controller 214 is coupled to a chaining DMA controller 224 through a parallel digital data bus 226.

The DMA controller 224 is coupled to a central processing unit (CPU) 228 and a memory management unit (MMU) 230 through the CPU bus 232. The MMU 230 is coupled to the memory 234 through the memory bus 236.

Each of the transceiver 210, the HDLC controller 214, the DMA controller 224, the CPU 228 and the MMU 230 are coupled to receive from and transmit to a communication/control signal bus 238. The MMU 230 and the memory 234 have a separate communication/control signal bus 240. The HDLC controller 214 is coupled to supply a receiver buffer full signal (RBF) 244 and a buffer empty signal (BES) 246 to the DMA controller 224. The DMA controller 224 is coupled to supply an interrupt signal 254, an Address Pointer Logic (APL) signal 256 and a Valid Address Logic (VAL) signal 258 to the CPU 228. In addition, the HDLC controller is coupled to supply a change of field (COF) 248 signal and an end of message (EOM) 250 signal to the DMA controller 224.

In FIG. 2 the twisted pair interface 212, the transceiver 210, the serial digital data bus 216 and the HDLC controller 214 form the packet data mode (PDM) system. The DMA controller 224, the CPU bus 232, the CPU 228, the MMU 230 the memory bus 236 and the memory 234 form the digital processing system. The parallel digital data bus 226 couples the PDM system to the digital processing system.

Chaining

The DMA and RX/TX contain the ability to receive and transmit a minimum of two complete messages without the required intervention of the CPU and this will be referred to as "chaining". This feature enables the CPU to pipeline memory addresses for uninterrupted data transmission and data reception. This method places a low burden on the CPU to update DMA registers immediately after a message is transmitted or received.

Rather, when conversing continuous data, the maximum interrupt cycle time limit of the CPU is increased from a few byte times to at least a full message plus a few byte times. This advantage becomes very important when the DMA is shared between multiple HDLC blocks and the system is expected to accommodate high data rates. With the present definition, the user also has the option of interrupting after multiple messages. In doing so, the user can update all DMA registers at one time, thereby reducing the interrupt inefficiencies and the interrupt latency by at least a factor of two.

Message Splitting

The end of message (EOM), change of field (COF), address pointer logic (APL), and valid address logic (VAL) signals have been added to provide the intimate interaction between the CPU/DMA/HDLC upon which this invention is based. Because of computer arithmetic and the associated housekeeping of where messages are to be stored, it is convenient to allocate blocks of memory which are the binary base raised to a power n, i.e., $2^3=8$, $2^4=16$, $2^5=32$, etc. The COF signal is used to signal the DMA when the CAF information has been received. The length of the CAF is programmed by the CPU and can vary in accordance with the length of the CAF field.

The DMA, upon receiving the COF indication, will change the location to where the remaining message (the DF data) will be stored. This effectively splits and stores the message into two parts, the CAF data and the DF data. This change of field is done automatically by the DMA with no required intervention of the CPU. This leaves the CPU uninterrupted to process other data, thus increasing the efficiency of the overall system.

As an example, at the layers 2 and 3 of the ISDN ISO model (to which this discussion is directed) the CAF field will contain at least four bytes of data and no more than eight bytes of data. The user will now only need to allocate a block of memory of 8 bytes ($2^3=8$) to accommodate the CAF field. The maximum number of bytes that can now be present in the DF field is 256, (260 − minimum CAF of 4). The memory allocation for the maximum amount of data in the DF field can be represented in blocks of 256 bytes, ($2^8=256$) identical to the maximum DF data.

In previous HDLC systems, because of the lack of this method of splitting messages, 512 bytes would have to be allocated to accept a message that contains 260 bytes of data (CAF and DF). The maximum memory efficiency of such a system would be 51%, (260/512). The maximum efficiency using the splitting method approaches 100% (4+256)/260. In addition, many messages will be very small, containing up to 8 bytes of CAF only. The minimum efficiency using the preferred method (4 bytes of CAF) will be 50% (4/8) because the DF field of 256 bytes will not have to allotted. The maximum efficiency will again approach 100% with 8 of 8 locations used. Using the traditional approach, the efficiency would vary from a low of less than 1% (4/512) to a maximum of 2% (8/512). With 80% of all messages being very small, the preferred method offers an improvement of 50 times the memory efficiency of the traditional approach for small messages.

Figure 3:
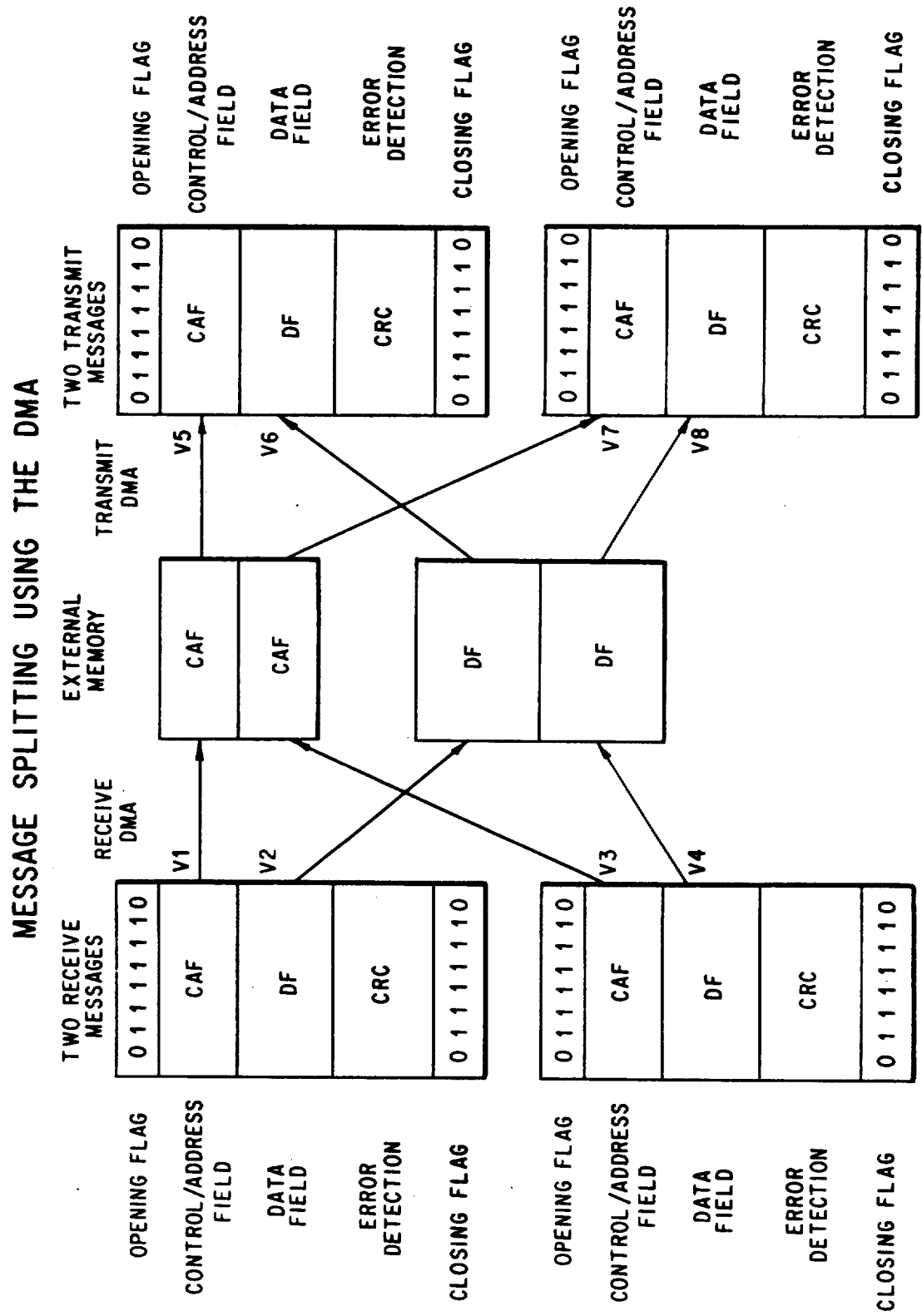
FIG. 3 shows a representation of how the memory is utilized according to the present invention.

FIG. 3 shows the method of splitting a message to increase memory efficiency. On the left are two ISDN messages to be received. Upon receiving an opening flag, the DMA stores CAF information for the first message in external memory via vector V1. After receiving a COF, the DMA begins using the vector V2 to store the DF information. When the first message is received, an EOM is issued to the DMA to select V3 as the next vector for the second message's CAF field. The EOM signal also interrupts the CPU (if programmed to interrupt after each message) so that it may update the V1/V2 vectors. This process continues for subsequent messages until the DMA begins using the V1 vector once again. The vectors must be at least 4 levels deep to support the DMA chaining of two messages, but the number of vector levels can be increased to support chaining of more than two messages. As mentioned before, data manipulation is often done in the CAF blocks in external memory to prepare the information for retransmission. FIG. 3 shows that to manipulate CAF information, the user will move, at the most, 8 bytes. In systems utilizing the traditional approach, as much as 260 bytes would have to be moved. The transmit DMA section works very similar to the receive section. When the transmitter starts sending a message, the DMA fetches the data required for the CAF field via vector V5. It then automatically begins fetching data for the DF field using vector V7. Upon completion of this task, it signals the CPU that the V5/V7 vectors can be updated and automatically switches to vector V6. The DMA is now available to retrieve information for the next message to be sent.

During a transmission using the preferred method, the user may now append separate DF to a single CAF. This proves useful when transmission is done to a single or very few destinations. In addition, the user may also send a common DF to many destinations easily. The DF need only be stored in one location and can be appended to multiple CAF headers. Each of these methods increase efficiency because less information is required to be stored and CPU data manipulation is minimized. The DMA/TX combination has the ability to send a message with only CAF information.

APL

The address pointer logic (APL) is used by the CPU to determine which vector (VA, VB, VC, etc.) is in use at any given instance. APL logic exists for both the transmitter or receiver and functions independently for each. FIG. 4 shows an example where three bits of APL are used to identify which vector is being used. In other words, when APL=110 then vector VG is being used; when APL=111 then vector VH is being used and so on.

After a vector has been used, the APL will increment by one or two depending upon whether there is data in the DF field. If the DF field contains data, the APL is incremented by one otherwise by two. After the APL has incremented to its limit, (in the case of FIG. 4, APL=111) the APL returns to the VA (000) vector and continues revolving, vectoring the messages as they are conversed.

When the APL is used in conjunction with VAL logic, (to be described later) the CPU can determine which vectors have been used and which vectors need to be updated at any given time. By using this information, the CPU can provide uninterrupted vectors to where message information is to be placed or retrieved from.

The number of bits in APL need not be fixed but can be reduced or increased to accommodate the level of chaining required for the appropriate system. (2 bits could vector two split messages, 4 bits could vector 8 split messages). With FIG. 4, the CPU can chain 4 split messages.

VAL

The valid address logic (VAL) is used in conjunction with the APL logic for housekeeping of address vectors. For each address vector there is a corresponding VAL bit that indicates the state of the vector. If the value is 0 the vector is considered invalid (used) and is valid if equal to 1. The VAL bit is set to a one when the vector is updated with a new value and is reset when the DMA has used the vector. The VAL logic tells the CPU which vectors need to be updated with new values and when used with the APL logic provides feedback for control of vectoring the messages.

In addition, the VAL logic can detect when the DMA has attempted to use an invalid vector and will signal the CPU of the error condition. By examining the VAL and APL bits the CPU can also determine messages that contain only CAF information, thus, enabling the unused DF block to be reallocated.

An improved memory management system is disclosed for a packet data mode system which is used in conjunction with a direct memory access controller. Changes and modifications to such a system which become apparent to those of ordinary skill in the art only after reading this document are deemed to be within the spirit and scope of this invention.

ACRONYM GLOSSARY

| ACRONYM GLOSSARY | |
|---|---|
| APL | Address Pointer Logic signal |
| BES | Buffer Empty Signal |
| CAF | Control/Address Field |
| COF | Change Of Field signal |
| CPU | Central Processing Unit |
| CRC | Cyclic Redundancy Check |
| DF | Data Field |
| DMA | Direct Memory Access |
| EOM | End Of Message signal |
| FIFO | First In First Out |
| HDLC | High level Data Link Controller |
| IFF | InterFrame Fill |
| ISDN | Integrated Services Digital Network |
| LAPD | Link Access Protocol in the "D" channel |
| MMU | Memory Management Unit |
| PDM | Packet Data Mode network |
| RBF | Received Buffer Full signal |
| RX | Receiver |
| TX | Transmitter |
| VAL | Valid Address Logic signal |

What is claimed is:

1. A memory management system for a Packet Data Mode System including a Direct Memory Access DMA controller coupled to a memory, the management system of the type for extracting and sending a message from the memory storage or receiving and storing the message to the memory storage the system comprising:
    a. means for receiving a message coupled to the DMA controller, wherein the message includes a Control/Address Field (CAF) and may include a Data Field (DF);
    b. storage means for generating a change of field signal coupled to the DMA controller for signifying an end of the first received of the CAF or DF;
    c. storage means for generating an end of message signal coupled to the DMA controller for signifying that the entire message has been received;
    d. said DMA controller storing the CAF and DF at separate addressable locations in the memory.

2. The memory management system according to claim 1 wherein said memory management system is further used in conjunction with a central processing unit (CPU), said system further comprising means coupled to the means for receiving and the DMA controller for chaining at least two complete messages together without requiring the intervention of said CPU for uninterrupted data transmission.

3. The memory management system according to claim 2 wherein said DMA controller has DMA registers which can be updated after transmission of a chained message.

4. The memory management system according to claim 2 wherein the DMA controller indicates locations in memory where said CAF and DF are stored.

5. The memory management system according to claim 4 wherein said means for indicating comprises a plurality of vectors stored in the memory.

6. The memory management system according to claim 5 further comprising an address pointer logic signal generated by the DMA controller and coupled to the CPU to determine which of the vectors is in use.

7. The memory management system according to claim 6 wherein the DMA controller instructs the CPU to update an appropriate one of said vectors.

8. The memory management system according to claim 7 wherein said means for instructing comprises a valid address logic indicator generated by the DMA controller having a first condition and a second condition for instructing the CPU to update said appropriate one of said vectors having a valid logic indicator in said second condition.

9. The memory management system according to claim 8 wherein the DMA controller determines if a DF is present.

10. The memory management system according to claim 1 wherein said system is a high level data link controller system.

11. The memory management system according to claim 10 wherein said HDLC system is an integrated services digital network system.

12. The memory management system according to claim 1 wherein a single DF may be appended to multiple CAF by the DMA controller.

13. The memory management system according to claim 1 wherein multiple DF may be appended to a single CAF by the DMA controller.

14. A memory management system for a Packet Data Mode System for communicating a message to and from a memory, each said message having a control/address field (CAF) and may have a data field (DF), comprising:
  (a) an HDLC controller;
  (b) a Direct Memory Access DMA controller having DMA registers coupled to the HDLC controller and to the memory;
  (c) a CPU coupled to the DMA controller and to the memory;
  (d) means for generating a change of field signal in said HDLC controller;
  (e) means for communicating said change of field signal from said HDLC controller to said DMA controller;
  (f) means for generating an end of message signal in said HDLC controller;
  (g) means for communicating said end of message signal from said HDLC controller to said DMA controller,
  (h) means in the DMA controller for chaining two or more messages together thereby forming a chained message without intervention by the CPU;
  (i) means in the DMA controller for updating said DMA registers after transmission of said chained message;
  (j) a plurality of vectors stored in the memory for indicating an address in memory where CAF and DF are stored;
  (k) means in the DMA controller for determining which of the vectors is in use;
  (l) means in the DMA controller for instructing the CPU to update an appropriate one of said vectors; and
  (m) means in the DMA controller for determining if a DF is present and for storing the CAF and DF at separate addressable locations in the memory.

* * * * *

UNITED STATES PATENT AND TRADEMARK OFFICE
CERTIFICATE OF CORRECTION

PATENT NO. : 5,047,927
DATED : September 10, 1991
INVENTOR(S) : Richard G. Sowell and Robert Pieters It is certified that error appears in the above - identified patent and that said Letters Patent is hereby corrected as shown below:

ON THE TITLE PAGE:   Item [75]   Inventor's Section, after "Richard G. Sowell" delete "Sam" and replace with --San--.

Signed and Sealed this

Twelfth Day of January, 1993

Attest:

DOUGLAS B. COMER

*Attesting Officer*   *Acting Commissioner of Patents and Trademarks*